UNITED STATES PATENT OFFICE.

CLEMENT W. BAILEY, HARRY S. DENNY, AND WILLIAM H. H. NORRIS, OF LANGWITH, ENGLAND.

PRODUCTION OF AMMONIUM SULFATE.

1,325,605.  Specification of Letters Patent.  Patented Dec. 23, 1919.

No Drawing.  Application filed December 2, 1918. Serial No. 265,000.

*To all whom it may concern:*

Be it known that we, CLEMENT WILLIAM BAILEY, HARRY SAMUEL DENNY, and WILLIAM HENRY HOBBS NORRIS, all subjects of the King of Great Britain and Ireland, and all residing at His Majesty's Factory, Langwith, in the county of Notts, England, have invented certain new and useful Improvements in and Relating to the Production of Ammonium Sulfate, of which the following is a specification.

This invention relates to the production of ammonium sulfate from gases containing ammonia, by the employment of niter cake.

The object of the present invention is to provide a process of producing ammonium sulfate in which the employment of free sulfuric acid is dispensed with.

Broadly, the invention consists in bringing together niter cake, water and sodium sulfate and ammonium sulfate, preferably separating out a proportion of the sodium sulfate and employing the resultant solution without the addition of acid for absorbing gaseous ammonia.

More particularly, the invention comprises bringing together the niter cake and ammonium and sodium sulfates, or a double sulfate of ammonium and sodium in the presence of water in conditions adapted to precipitate a quantity of normal sodium sulfate corresponding substantially with the molecular proportion of sodium contained in the niter cake, and employing the solution for absorbing ammonia.

When necessary according to the invention, the solution resulting from the absorption of the ammonia is subjected to evaporation under conditions which cause ammonium sulfate to separate as such, and which produce products adapted for treating a further quantity of niter cake in the manner described.

Briefly stated, the addition of water to the absorbent and corresponding evaporation of water from the liquor passed to the evaporators is necessary in carrying the present invention into effect, in circumstances such as obtain when such treatment is necessary in producing ammonium sulfate by the employment of free sulfuric acid, thus for instance in producing ammonium sulfate from Mond gas dilution and evaporation is generally resorted to, while in producing ammonium sulfate from coke oven gases, or gases from other coal distillation plants, dilution and evaporation will be unnecessary.

According to one phase of the invention, a double salt of ammonium and sodium, namely: ammonium sodium sulfate which in the crystalline form has the constitution represented by the formula

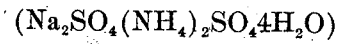
$$(Na_2SO_4(NH_4)_2SO_4H_2O)$$

and niter cake are brought together in the presence of water. Sodium sulfate is thereby caused to separate, and is removed at a suitable temperature, the liquid portions being passed, if necessary with the addition of water, to the absorption system. The resultant solution is then treated, should the addition of water render such treatment necessary, in an evaporator in order to produce a concentrated solution from which the aforesaid double salt of ammonium and sodium will separate on cooling. The concentrated solution is cooled, the double salt separated out, and the resultant solution treated in an evaporator for the purpose of concentrating the solution to a degree at which ammonium sulfate separates out, after which the liquid is drawn off from the evaporator in order to prevent its becoming saturated in respect to ammonium sodium sulfate.

In a process according to this phase of the invention where an addition of water and evaporation are needed, as for instance in producing ammonium sulfate from Mond gas, 5500 parts of niter cake may be treated with 3100 parts of water, 3000 parts of ammonium sulfate and 2295 parts of sodium sulfate, at a temperature between 80–100° C., with the production of a mixture consisting of 3100 parts of water, 3000 parts of ammonium sulfate, 6175 parts of sodium sulfate and 1670 parts of sulfuric acid in the form of sodium hydrogen sulfate. From this mixture 3880 parts of sodium sulfate precipitates and is removed and 6700 parts of water added and the solution is then employed to absorb 577 parts of ammonia. The resulting solution will consist of 9800 parts of water, 5240 parts of ammonium sulfate and 2295 parts of sodium sulfate, and on treatment in an evaporator, 3195 parts of water are removed and then a quantity of the double salt is separated equivalent to 720 parts of water, 1310 parts of ammonium sulfate and 1510 parts of sodium sulfate. The remaining solution is treated in an evaporator in order to remove 2785 parts of water and to cause the separation of 2240 parts of ammonium sulfate, whereafter the residual solution in the evaporator together with the separated double salt referred to above is adapted both as regards quantity and composition for treating a further 5500 parts of niter cake.

According to another phase of the invention, a solution containing sodium sulfate and ammonium sulfate is brought together with niter cake, the sodium sulfate deposited is separated out and the resultant solution is employed for absorbing ammonia, whereafter by concentration to a suitable degree, if such concentration be required, ammonium sulfate is separated, as such, from the solution, and this solution is then suitably employed for treating further quantities of niter cake.

In a process in accordance with this phase of the invention where an addition of water and evaporation are needed as for instance in producing ammonium sulfate from Mond gas, the solution employed for treating 5550 parts of niter cake, may consist of 6500 parts of water, 5300 parts of ammonium sulfate and 2295 parts of sodium sulfate. The product obtained will consist of 6500 parts of water, 5300 parts of ammonium sulfate, 6175 parts of sodium sulfate and 1670 parts of sulfuric acid; on separation of the sodium sulfate introduced into the system from the niter cake. The resulting solution will have a composition equivalent to 6500 parts of water, 5300 parts of ammonium sulfate, 2295 parts of sodium sulfate and 1670 parts of sulfuric acid. To this solution 7500 parts of water may be added and the resultant solution may be used in an absorption tower for absorbing 577 parts of ammonia; the product is then treated in an evaporator in which 7500 parts of water are removed and 2240 parts of ammonium sulfate are separated out with the production of a solution similar in composition and quantity to that originally used for treating the niter cake and which therefore may be used in a similar manner for treating further quantities of niter cake.

In carrying the invention into effect in one convenient manner, and in accordance with the first mentioned phase when producing ammonium sulfate from, for instance, Mond gas, the niter cake in lump or granular form is introduced into a suitable vessel provided with an agitator which may be operated mechanically, and into the vessel also the double salt obtained in a previous cycle is introduced. The contents of the vessel are agitated together and then transferred to a filter which separates the normal sodium sulfate, the filtrate being passed to the circulating system of the absorption section or other equivalent portion of the plant in which the reaction between the absorbent and ammonia takes place. At the same time in order to prevent the deposition of the solids in solution in the filtrate employed as the absorbent solution, water is added to the solution. The liquor produced in the absorption apparatus is continuously drawn off in the usual way and is delivered to an evaporator where the liquor is concentrated to a point at which, on cooling to a particular temperature, the double salt of ammonium and sodium will crystallize out. The crystallized double salt is separated from the liquid portion by means of a suitable filter and the filtrate is concentrated in a second evaporator to a degree sufficient to cause the ammonium sulfate to crystallize out but insufficient to cause the crystals obtained to be materially contaminated with sodium sulfate. The crystals of ammonium sulfate are removed from the evaporator in the usual manner, while the mother liquor is drawn off either continuously or periodically at suitable intervals in order that the desired degree of concentration referred to above may not be exceeded, and is returned to the vessel into which the niter cake as well as the separated double salt of ammonium and sodium is introduced.

In carrying the invention into effect in one convenient manner according to the above mentioned second phase of the invention when producing ammonium sulfate from, for instance, Mond gas, the niter cake is introduced in lump or granular form into a vessel provided with an agitating device operated mechanically or otherwise, and the solution containing sodium sulfate and ammonium sulfate is also introduced into this vessel. As a result, sodium sulfate is deposited in the proportion indicated above, and is filtered off by means of, for example, a vacuum filter or centrifugal hydro-extractor and the filtrate is employed in the circulating system of the absorption section of the plant where the usual reaction between the ammonia and acid takes place.

In the circulating system a certain quantity of water is introduced into the circulating tank in order to maintain the solution at the desired concentration and to prevent the deposition of the solids in solution. The solution is then transferred to an evaporator where water is driven off to an extent sufficient to cause ammonium sulfate of the desired degree of purity to separate out but insufficient to cause the ammonium sulfate to be contaminated to an undesirable extent with sodium sulfate, the solution in the evaporator is then drawn off and employed in treating a further quantity of niter cake.

When producing ammonium sulfate from, for instance, coke oven gases where dilution of the absorbent and concentration of the liquid from the saturators is not necessary, 3460 parts of niter cake may be treated at a suitable temperature with 4400 parts of water, 4100 parts of ammonium sulfate and 1500 parts of sodium sulfate with the production of a mixture consisting of 4400 parts of water, 4100 parts of ammonium sulfate, 2500 parts of sodium bisulfate and 2420 parts of sodium sulfate which will be in suspension, the sodium sulfate in suspension is removed from the liquid by treatment in, for instance, a vacuum filter or centrifugal hydro-extractor and the solution is employed for absorbing, say, 360 parts of ammonia, giving a product consisting of 4400 parts of water, 4100 parts of ammonium sulfate in solution, 1500 parts of sodium sulfate and 1400 parts of ammonium sulfate in suspension. By treatment of this composition by means of a vacuum filter, the suspended ammonium sulfate will be removed from the liquid portion which may then be employed in treating a further quantity of niter cake.

It will thus be seen that sodium sulfate and ammonium sulfate are as such abstracted from the system in amounts equivalent to the amount of ammonia and sulfuric acid and sodium sulfate, in the form of niter cake, introduced, while if water is introduced into the system, it is also abstracted in an amount equivalent to the amount added.

In connection with the present invention, it may be noted that when evaporation of water is effected the amount evaporated per ton of ammonium sulfate produced is about the same as would be evaporated if sulfuric acid were used in the ordinary way.

A further important feature is that all the excess sodium sulfate introduced in the form of niter cake is precipitated before the liquor passes to the absorbers, and thus the difficult and costly operation of evaporating in the presence of a large amount of sodium sulfate is avoided.

A third feature is that the removal of the double salt of ammonium and sodium in one phase of the invention, as described, enables a considerable amount of ammonium sulfate to be obtained in a pure form, while the double salt requires no purification and being brought into association with further bodies of niter cake, itself assists in the removal of the sodium sulfate.

A further point is that any acid which may not be neutralized in the absorber and may pass thence to the evaporator is not lost but is returned by way of the vessel into which the niter cake is introduced.

It is to be understood that the proportions of the various materials referred to above are stated in parts by weight and that the particulars as to proportions are given by way of example for the purpose of explaining the invention.

It is further to be understood that the invention is mainly concerned with a continuous or cyclic process.

Having now described our invention what we claim as new and desire to secure by Letters Patent is:—

1. The process of producing ammonium sulfate from gases containing ammonia which consists in bringing together niter cake, ammonium sulfate and sodium sulfate in the presence of water, separating out a proportion of the sodium sulfate and employing the resultant solution without the addition of acid for absorbing gaseous ammonia, substantially as described.

2. The process of producing ammonium sulfate in which niter cake, and ammonium sulfate and sodium sulfate or a double sulfate of ammonium and sodium are brought together in the presence of water in conditions adapted to precipitate a quantity of normal sodium sulfate corresponding substantially with the molecular proportion of sodium contained in the niter cake, and employing the solution for absorbing ammonia, substantially as described.

In testimony whereof we have signed our names to this specification.

C. W. BAILEY.
H. S. DENNY.
W. H. H. NORRIS.